United States Patent Office 3,719,696
Patented Mar. 6, 1973

3,719,696
ORGANOSILICON POLYMERS CONTAINING
SILACYCLOBUTANE STRUCTURES
David Andrew Jonas, Pencoed, and William John Owen, Penarth, Wales, assignors to Dow Corning Limited, London, England
No Drawing. Filed Mar. 12, 1971, Ser. No. 123,855
Int. Cl. C07d 103/02; C07f 7/08
U.S. Cl. 260—448.2 D     3 Claims

ABSTRACT OF THE DISCLOSURE

Organosilicon homopolymers and copolymers containing

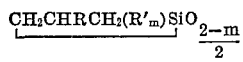

units wherein R is H or lower alkyl, R' is hydrocarbyl, fluorohydrocarbyl or alkoxyalkyl and $m$ is 0 or 1, are prepared by hydrolysis or cohydrolysis of silanes containing

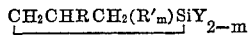

where R, R' and $m$ are as above defined and Y is a hydrolyzable atom or group. These new polymers are useful as water repellents and coating compositions on textiles, glass fibers and powdery substrates as well as in manufacture of silicon rubbers and resins.

---

This invention relates to organosilicon homopolymers and copolymers containing silacyclobutane structures.

It is known to polymerize silacyclobutanes to provide organosilicon polymers in which the silicon atoms in the polymer chain are joined through alkylene radicals. This invention is concerned with organosilicon copolymers in which there are present one or more silacyclobutane structures. Polymers of this type are of particular interest because the presence of the silacyclobutane structures therein provides a means whereby crosslinking of the polymers can be effected.

Thus, it is the object of this invention to introduce a novel class of organosilicon polymers containing silacyclobutane groups as crosslinking sites. Other objects and advantages are detailed in or will be apparent from this disclosure.

This invention introduces a class of organosilicon polymers having therein at least one unit of the general formula

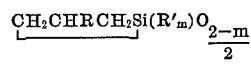

wherein R represents a hydrogen atom or an alkyl radical having less than 7 carbon atoms, R' represents a hydrocarbyl radical, a fluorinated hydrocarbyl radical or an alkoxyalkyl radical and $m$ is 0 or 1.

Examples of R' radicals which can be present in the polymer are alkyl radicals, aryl radicals, aralkyl radicals, alkaryl radicals and alkenyl radicals, e.g., methyl, ethyl, propyl, tetradecyl, octadecyl, vinyl, allyl, phenyl, tolyl, benzyl and naphthyl radicals and the 3,3,3-trifluoropropyl and $(CF_3)(CF_2)_6CH_2CH_2$-radicals. The substituent R can be a hydrogen atom or an alkyl radical containing less than 7 carbon atoms, e.g., methyl, ethyl, butyl and hexyl. The terms "hydrocarbyl" and "fluorinated hydrocarbyl" are employed in their art accepted sense to include radicals of 1 to 30 carbon atoms and most commonly 1 to 18 carbon atoms.

The organosilicon polymers of this invention can be siloxanes as well as silethylene siloxanes and include homopolymers, copolymers and disiloxanes containing the specified unit. They can vary in molecular size from that of the disiloxane up to very high molecular weight gums of $10^7$ cs. at 25° C. or higher but soluble in common organic solvents such as benzene.

They can thus consist solely of the specified siloxane units or they can be copolymers of such siloxane units with units of the general formulae

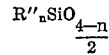

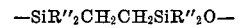

or both, wherein $n$ is 0, 1, 2 or 3 and each R" represents a hydrocarbyl radical, fluorinated hydrocarbyl radical, a monovalent radical composed of carbon, hydrogen and oxygen wherein the oxygen is present as ether linkages, an aminoalkyl radical or a cyanoalkyl radical. Examples of such radicals include methyl, ethyl, propyl, decyl, octadecyl, vinyl, phenyl, 3,3,3-trifluoropropyl, methoxyethyl, ethoxypropyl, aminopropyl, aminobutyl, N-bata-aminoethyl-gamma-aminopropyl, N - beta - aminoethyl-gamma-amino-isobutyl and cyanopropyl.

Examples of copolymeric units which can be present in the copolymers of this invention, therefore, are phenylsiloxane, dimethylsiloxane, diphenylsiloxane, phenylmethylsiloxane, methylvinylsiloxane, methyl(3,3,3 - trifluoropropl) siloxane, methyldecylsiloxane, trimethylsiloxane, dimethylvinylsiloxane and diethylvinylsiloxane units.

Illustrative of the organosilicon polymers of the invention are:

 (1)

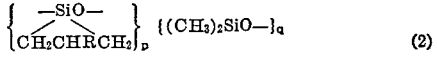 (2)

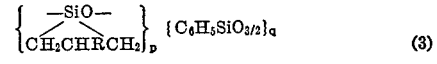 (3)

and

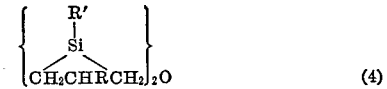 (4)

wherein $p$ and $q$ are integers.

Of particular interest are copolymers of the general formula

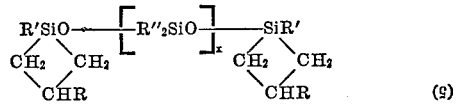 (g)

wherein R, R' and R" are as hereinbefore defined and $x$ represents an integer of at least 1 and preferably from 1 to 1,000. The presence of the terminal silacyclobutane structures in such polymers renders them crosslinkable to rubbery products and thus suitable for use in the manufacture of organosilicon based elastomers.

The siloxane homopolymers of this invention, that is, those illustrated by Formua 1 hereinabove, can be prepared by the hydrolysis of a silacyclobutane of the formula

 (5)

wherein Y represents a hydrolyzable alkoxy radical, a primary, secondary or tertiary amino radical or a halogen atom, and condensation of the hydrolysis product. Examples of Y substituents are methoxy, ethoxy, isopropoxy, butoxy, amino, ethylamino, dimethylamino, phenylamino, chlorine and bromine. The alkoxy substituted silacyclobutanes can be prepared by the alkoxylation of the corresponding chlorosilacyclobutane employing an alkyl orthoformate or by reaction of the chlorosilacyclobutane with an alcohol in the presence of an HCl acceptor. Conventional techniques for the hydrolysis of halo, alkoxy and amino silanes and subsequent condensation of the product can be employed. However, in order to preserve the silacyclobutane ring structure in the polymer, the hydrolysis and condensation steps are best carried forward in the substantial absence of acidic or basic substances or other materials which cause opening of the silacyclobutane structure. When Y is halogen, therefore, hydrolysis of the silacyclobutane is best performed in the presence of an acceptor for the liberated hydrogen halide.

The disiloxanes of the invention, that is, the siloxanes represented by Formula 4, can be prepared by the hydrolysis of the silacyclobutane,

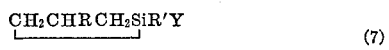  (7)

wherein R, R' and Y are as above defined, and condensation of the hydrolysis product.

Copolymers of the invention are best prepared by the reaction of a silacyclobutane represented by Formula 6 or Formula 7 herein, in which Y represents an alkoxy or amino radical or a halogen atom, with an organosilicon compound containing ≡SiOH groups, for example, an organosilanol of the general formula $R''_aSi(OH)_{4-a}$ in which $a$ has a value of 1, 2 or 3, a linear organosiloxanol of the formula $HO\{R''_2SiO\}_qH$ in which $q$ is an integer $>1$, or silethylene-siloxanol or a hydroxyl containing siloxane resin, copolymer of $R''SiO_{3/2}$ units, $R''_2SiO$ units and/or $R''_3SiO_{1/2}$ units wherein the average ratio of $R''/Si$ is in the range from 0.9/1 to 1.8/1, preferably 1/1 to 1.6/1, and there are at least two residual OH groups bonded to Si in each molecule. For example, 2 moles of a silacyclobutane containing one silicon-bonded Y substituent per molecule can be reacted with 1 mole of diphenylsilanediol to provide a trisiloxane. More preferably, however, a silacyclobutane containing one or two silicon-bonded Y substituents per molecule is reacted with one or more organosiloxanols to provide copolymers of the type illustrated by Formulae 2, 3 and 5. When Y is halogen, the reaction is preferably carried out in the presence of an halogen acid acceptor, e.g., a tertiary amine, for the liberated hydrogen halide.

The copolymers can also be prepared by reaction of an alkali metal silanolate with the chloro-substituted silacyclobutane.

The proportion of silacyclobutane-substituted siloxane units in the copolymers can be varied within very wide limits depending on the properties desired therein. Thus, when a copolymer having a low crosslinking potential is desired, the proportion of silacyclobutane-substituted siloxane units can be as low as 0.05 percent. On the other hand, highly crosslinkable copolymers can be obtained containing up to 99.95 mol percent of such units.

Reaction between the silacyclobutane and the ≡SiOH containing organosilicon material to form organosilicon polymers according to this invention will in most cases occur merely on bringing the reactions together at ambient temperature. The reaction involving the alkoxy-substituted silacyclobutane can be expedited, if desired, by the inclusion in the reaction mixture of a catalyst, e.g., a titanium alkoxide.

The preparative reaction can be expedited by the application of heat. The use of temperatures above about 150° to 170° C. should, however, be avoided since these can lead to opening of the silacyclobutane ring structure. Solvents can be employed in the reaction mixture, if desired. Examples of solvents which can be employed are toluene, xylene, benzene, hexane, pentane and petroleum ether.

The organosilicon polymers and copolymers of this intion can be converted to the crosslinked state at elevated temperatures, generally from 180° C. to below the decomposition temperature of the product. The temperature at which crosslinking takes place can be substantially reduced by contacting the organosilicon polymer with a substance which promotes opening of the silacyclobutane ring structure. Substances which are presently known to be effective in rupturing the silacyclobutane ring include chloroplatinic acid, the known complexes of chloroplatinic acid (e.g., U.S. Pat. No. 3,532,649, issued Oct. 6, 1970), aluminum chloride and potassium hydroxide. Other suitable substances include oxides, bases, organometallic compounds, e.g., stannous octoate, dibutyltin dilaurate, dibutyltin diacetate and dicobalt octacarbonyl. Another suitable substance is fume silica.

The polymers and copolymers of this invention can be used in any of the variety of applications requiring a polymerizable or crosslinkable organosilicon polymeric system. For example, the polymers, and more particularly the copolymers, find application as water repellents and coating compositions for textiles, masonry, glass, powders and the wide variety of substrates to which the organosilicon polymers can advantageously be applied. Copolymers of relatively high molecular weight are useful, for example, in the manufacture of vulcanizable silicone rubber compositions and resins, where vulcanization or crosslinking can be brought about in the absence of the conventional vulcanization and crosslinking agents.

The following examples illustrates the invention.

EXAMPLE 1

Magnesium (19.5 g.), which had been activated by contact with iodine vapor, was added gradually over 8 hours to a solution of gamma-chloropropyl-trichlorosilane (106 g.) in diethyl ether (500 ml.). The mixture was then refluxed for a further 24 hours, filtered and the filtrate fractionally distilled to yield 1,1-dichloro-1-silacyclobutane

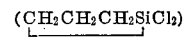

To 20 g. of the silacyclobutane so obtained was added dropwise, methyl orthoformate (32 g.) and the mixture was stirred overnight at room temperature. Fractionation of the reaction mixture yielded 1,1-dimethoxy-1-silacyclobutane (14.5 g.), B.P. 126 to 128° C.,

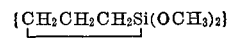

Water (1 ml.) was added dropwise to a boiling solution of the dimethoxysilacyclobutane (2 g.) in benzene (30 ml.), the mixture was refluxed for 3 hours and stripped to remove solvent. The product remaining was a clear, viscous, polymer which was soluble in organic solvents.

This polymer was heated in an open tube to a temperature of 180° C. and a highly crosslinked, insoluble material was obtained.

EXAMPLE 2

A solution of dimethoxy-silacyclobutane (1.5 g.) in toluene (20 ml.) was added, dropwise to a boiling solution of $HO\{(CH_3)_2SiO\}_{10}H$ (7.6 g.) in toluene (30 ml.). The mixture was refluxed overnight approximately 16 hours) and was then stripped of solvent. The product remaining was a viscous, toluene-soluble copolymeric material containing dimethylsiloxane unit and

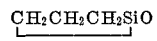

units. This copolymeric material (0.5 g.) was heated in an open tube, the temperature being raised from 20 to 200° C. in 30 minutes. On cooling, the polymer was found to have been converted to a clear, brittle rubber which was insoluble in toluene.

EXAMPLE 3

1-methyl-1-chloro-1-silacyclobutane

(10 g.) in ether (40 ml.) was added to water (50 ml.) containing enough sodium carbonate to neutralize the hydrochloric acid formed during the hydrolysis. The ether layer was separated, washed with distilled water until neutral and then dried over molecular sieve. Distillation of the dried ether solution yielded the disiloxane

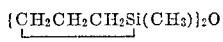

B.P. 59° C. (2.5 mm.). The product was identified by elemental and N.M.R. analysis.

EXAMPLE 4

A silanol-terminated polydimethylsiloxane having approximately 100 dimethylsiloxane units was introduced into a flask under an atmosphere of dry nitrogen. Dry diethyl ether was then introduced into the flask and the polydimethylsiloxane taken into solution. Into this solution was introduced 0.0027 mole of methyl lithium as a 4% by weight solution in diethyl ether.

The solution was stirred for one hour at 22° C. and to it was added 1 - methyl-1-chloro-1-silacyclobutane (0.40 g.). After stirring for a further one hour, the ether was removed under reduced pressure and the remaining product filtered. This product was a colorless polydimethylsiloxane liquid having silacyclobutane endstopping groups.

EXAMPLE 5

Equivalent results were achieved when Example 2 was repeated employing place of the dimethoxy-silacyclobutane, an equivalent amount of any of the following:

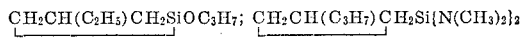

or

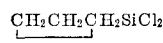

in the presence of pyridine.

EXAMPLE 6

Equivalent results were achieved when Example 4 was repeated employing in place of the silanol terminated polydimethylsiloxane, a resinous copolymer of 60 mol percent $CH_3SiO_{3/2}$ units, 30 mol percent $(CH_3)_2SiO$ units, 5 mol percent $C_6H_5SiO_{3/2}$ units, and 5 mol percent $$CF_3CH_2CH_2SiO_{3/2}$$

units, said copolymer containing 2 weight percent of residual hydroxyl groups bonded to silicon.

That which is claimed is:

1. An organosilicon copolymer consisting of from 0.05 to 99.95 mol percent of units of the general formula

wherein R represents a hydrogen atom or an alkyl radical having less than 7 carbon atoms, R' represents a monovalent hydrocarbon radical, a monovalent fluorinated hydrocarbon radical or an alkoxyalkyl radical and m is 0 or 1, and from 99.5 to 0.05 mol percent of units of the general formulae

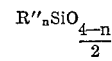

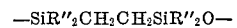

or both, in which $n$ is 0, 1, 2 or 3 and each R" represents a monovalent hydrocarbon radical, monovalent fluorinated hydrocarbon radical, an alkoxyalkyl radical an aminoalkyl radical or a cyanoalkyl radical.

2. An organosilicon polymer of the general formula

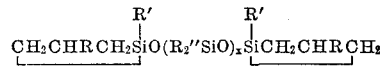

wherein R, R' and R" are as defined in claim 1 and $x$ is an integer of at least 1.

3. An organosilicon polymer as claimed in claim 1 wherein R represents a hydrogen atom and R' and R" represent methyl radicals.

References Cited

UNITED STATES PATENTS 3,046,291 7/1962 Sommer _____ 260—448.2 D

OTHER REFERENCES

Noll, "Chemistry and Technology of Silicones," Academic Press, N.Y. (1968), p. 201.

DANIEL E. WYMAN, Primary Examiner

P. F. SHAVER, Assistant Examiner

U.S. Cl. X.R.

106—13; 117—124 F, 126 GS; 252—8.6; 260—46.5 P, 448.2 E